(12) United States Patent
Reilly

(10) Patent No.: US 8,099,637 B2
(45) Date of Patent: Jan. 17, 2012

(54) SOFTWARE FAULT DETECTION USING PROGRESS TRACKER

(75) Inventor: John R. Reilly, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 887 days.

(21) Appl. No.: 11/928,678

(22) Filed: Oct. 30, 2007

(65) Prior Publication Data

US 2009/0113255 A1 Apr. 30, 2009

(51) Int. Cl.
*G06F 11/00* (2006.01)
*G06F 11/34* (2006.01)

(52) U.S. Cl. .......... 714/55; 714/47.1; 714/47.2; 714/50; 714/51

(58) Field of Classification Search .................... 714/13, 714/15, 38, 45, 55, 50, 51, 47.1, 47.2
See application file for complete search history.

(56) References Cited

U.S. PATENT DOCUMENTS

| 5,475,813 | A  | * | 12/1995 | Cieslak et al. | 714/4 |
| 5,737,515 | A  | * | 4/1998  | Matena | 714/23 |
| 6,385,637 | B1 | * | 5/2002  | Peters et al. | 718/107 |
| 6,449,733 | B1 | * | 9/2002  | Bartlett et al. | 714/13 |
| 7,020,797 | B2 | * | 3/2006  | Patil | 714/4 |
| 7,383,460 | B2 | * | 6/2008  | Sherwin et al. | 713/600 |
| 7,475,002 | B1 | * | 1/2009  | Mann | 703/23 |
| 7,689,875 | B2 | * | 3/2010  | Cahill et al. | 714/55 |
| 7,950,013 | B2 | * | 5/2011  | Sato et al. | 718/102 |
| 2005/0015766 | A1 | * | 1/2005 | Nash et al. | 718/102 |
| 2005/0281204 | A1 |   | 12/2005 | Karol et al. | |
| 2006/0143492 | A1 |   | 6/2006  | LeDuc et al. | |
| 2006/0184842 | A1 | * | 8/2006  | Boucher | 714/55 |
| 2007/0050673 | A1 | * | 3/2007  | DiBartolomeo et al. | 714/27 |
| 2007/0055918 | A1 | * | 3/2007  | Snover et al. | 714/57 |

* cited by examiner

*Primary Examiner* — Joseph Schell

(57) ABSTRACT

The invention provides for software fault detection. A software process tracks its own progress. In the event the timer times out, a handler checks the progress. If the progress meets a fault criterion, a fault response is executed.

18 Claims, 1 Drawing Sheet

# SOFTWARE FAULT DETECTION USING PROGRESS TRACKER

BACKGROUND OF THE INVENTION

The present invention relates to software fault detection. Many network devices rely on continuously running software for proper operation. When a software fault occurs some corrective action must be taken, e.g., a reboot or fail-over to another instance of the software. Before the corrective action is taken, the fault must be detected.

Since failed software cannot be counted on to positively indicate its own fault, some fault detection schemes employ a "watchdog" timer. This can be a hardware timer or a virtual timer provided by an operating system based on a hardware timer. A watchdog timer counts (up or down) to some threshold at which it will trigger an interrupt or other fault response. The software being "watched" is designed to repeatedly reset the watchdog timer so that it does not time out as long as the software is functioning properly.

Setting the time-out period can involve a tradeoff between: 1) allowing for long-duration actions to complete without resulting in a false fault detection; and 2) providing a rapid fault detection so that interruptions in the software's functionality are limited in duration. What is needed is an approach to fault detection that avoids the compromises typically imposed by this tradeoff.

Herein, related art is described to facilitate understanding of the invention. Related art labeled "prior art" is admitted prior art; related art not labeled "prior art" is not admitted prior art.

BRIEF DESCRIPTION OF THE DRAWING

The FIGURE depicts implementations/embodiments of the invention and not the invention itself.

DETAILED DESCRIPTION

Figure 1:
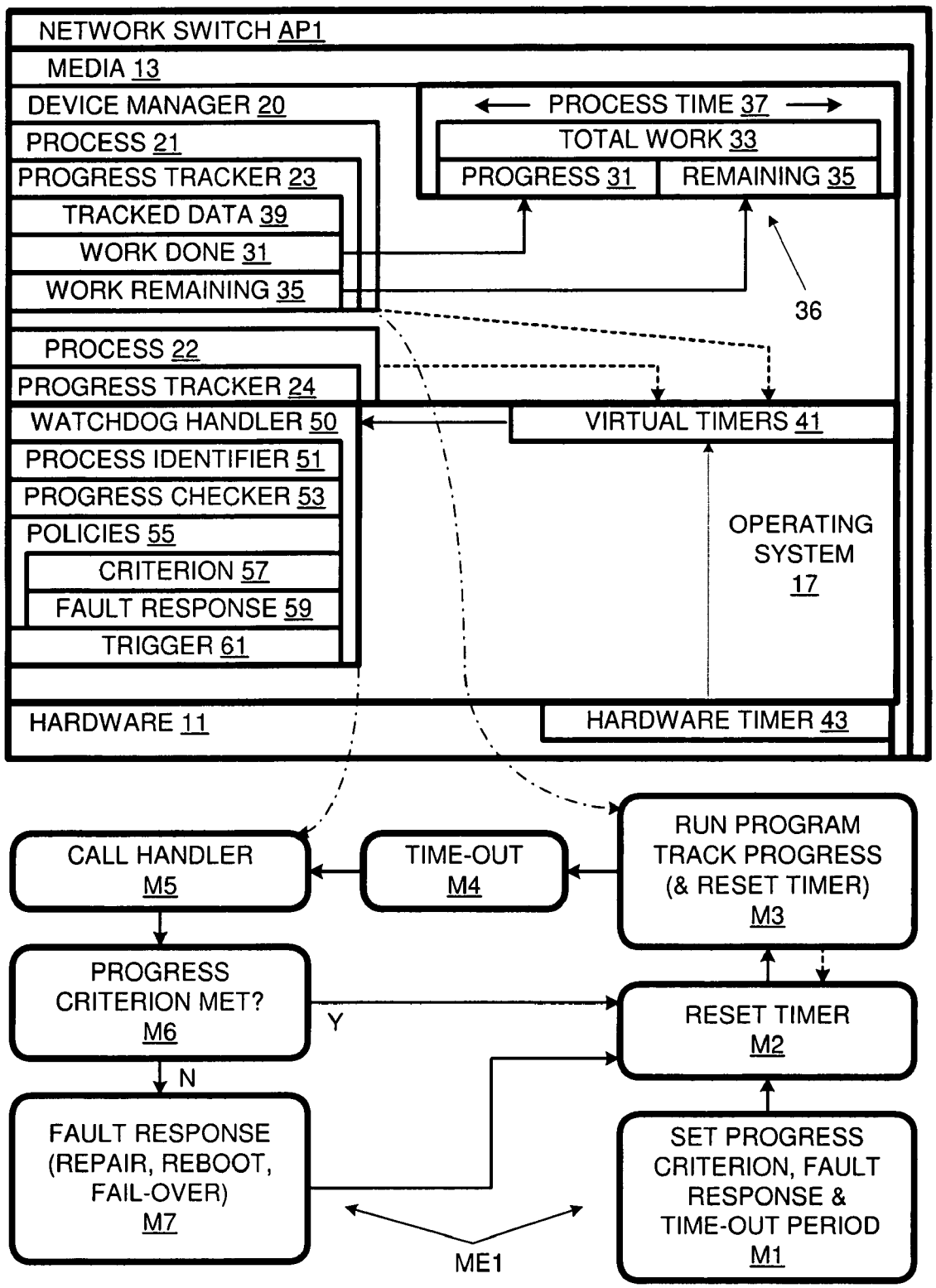
FIG. 1 is a combination schematic diagram and flow chart of embodiments of the invention.

In accordance with an embodiment of the present invention, the response to a process time-out is a determination of whether or not a fault has occurred (rather than a direct fault response). A process tracks its own progress; upon a time-out, a handler checks the progress. Only if the progress fails to meet a progress criterion (or meets a fault criterion) is a fault response executed. Otherwise, the process is allowed to continue. Accordingly, the time-out period can be set to meet the time required for fault detection and independently of the time required for the process to complete a task. Thus, the tradeoff involved in the conventional watchdog approach is avoided.

A network switch AP1 in accordance with an embodiment of the invention is shown in FIG. 1. Network node devices, such as computers and printers may rely on network switch AP1 for their communications. Accordingly, down time for switch AP1 can be costly in terms of overall network functionality.

Network switch AP1 includes hardware 11, including connectivity ports and a interconnect fabric that provides internal connections between the ports. Hardware 11 also includes one or more processors for executing program instructions and media 13 for storing instructions and data. In addition, hardware 11 includes a hardware timer 43.

The programs can include an operating system 17 and a device manager 20. Device manager 20 can include one or more processes, such as processes 21 and 22 that include progress trackers 23 and 24; Device manager 20 can also include processes without progress trackers.

Progress tracker 23 tracks progress of or "work done" by process 23. Depending on the process, progress can be tracked in a variety of ways. For example, a task undertaken by process 23 may consist of a series of steps; in that case progress can be tracked in terms of movement from one step to the next. A process can include an iterative loop; in such a case, loop iterations can be counted as progress. Other process specific measures of progress are provided for by the invention.

Progress tracker 23 provides for tracking of relative progress, i.e., progress relative to a parameter associated with a total effort projected to be required, e.g., a total number of steps to be taken, a total amount of data to be processed, etc. The projection can be updated periodically as more information becomes available. For example, a total time estimate can be adjusted as more data is obtained concerning how much each step or unit of data has consumed up to the present. The total work 33 less current progress 31 yields remaining work 35, as shown at 36. Note that progress can be evaluated in terms of process time 37 rather than real time; thus, if the reason that a process has not made progress is that the operating system has not allocated any processing cycles to it, the lack of progress will not be interpreted as a fault. Progress tracker 23 stores a recent chronology of progress data as tracked data 39.

Progress tracker 24 of process 22 is similar to progress tracker 23. However, it may track a different parameter and use a different method for projecting total work. For example, progress tracker 23 can track steps in a task while progress tracker tracks iterations of a loop or number of bytes of a file being processed. Also, one progress tracker may project the amount of work required for the entire task, while the other simply tracks progress without regarding to any total work or remaining work to be done.

Processes 21 and 22 have their respective "missions" (e.g., handling configuration or exception messages) to which the bulk of their code is directed. Because handler 50 evaluates progress and allows progress to continue if the progress criterion is met, it is not generally necessary for the process to reset its timer. In the illustrated embodiment, each process can be configured to either 1) occasionally reset the respective virtual timer, or 2) not reset the respective virtual timer. The fact that resetting can be implemented or not by a process is indicated by the dotted arrow back from method segment M3 to method segment M2.

A process can be configured to reset the timer if it costs less to reset the timer than to have the timer trigger and evaluate the criteria. If the cost is reversed, then not resetting the timer is appropriate. In the first case, it is still possible the process designer may choose not to reset the timer, e.g. the code is third party, and the designer cannot modify it, the schedule doesn't allow for proper analysis to determine the appropriate locations to reset the timer, etc.

Each virtual timer 41 maintains a time count for a respective process. Operating system 17 sets a hardware timer 43 to the shortest count among the virtual timers. A time-out of the hardware timer 43 indicates that one (or possibly more) virtual timers have expired.

In the event that hardware timer 43 times out, an interrupt (or similar event) is triggered causing a watchdog handler 50 to be activated. Handler 50 includes a process identifier 51 that determines what process has timed out by determining which virtual timer time out. Handler 50 also includes a progress checker that checks the progress indications for the identified process.

Handler 50 stores default or user-specified time-out policies 55, which include both a progress criterion 57 and a response 59 to be taken if the progress criterion is not met (in which case a fault is indicated). Progress checker 53 compares the current progress data with the progress criterion: if the criterion is met, the respective virtual timer is reset and the process, e.g. process 21 is allowed to continue. If progress criterion 57 is not met, progress checker 53 initiates failure response 59, which can involve repairing process 21, rebooting process 21 or manager 20, failing over to a back up copy of device manager 20, or possibly halting the switch AP1 (e.g., upon successive fault detections and attempts to repair).

A method ME1 implemented in switch AP1 is flow charted at the bottom of FIG. 1. At method segment M1, a progress criterion, a fault response, and a time-out period are set for one or more processes of device manager 20. The progress criterion can be simple or complex. For example, a simple criterion might be simply that the present progress indication 31 show progress relative to the most recent past progress indication as indicated by tracked data 39. A more complex progress criterion might require that the remaining work projection 35 have been reduced or that the proportion of total work 33 done has been reduced. A further refinement might include a combination of these, with early projections discounted for lack of available data.

The invention provides for various fault responses. Often a process, e.g., process 21, can be restarted, the incorporating program, e.g., device manager 20, can be relaunched, or the device, e.g., switch AP1, can be rebooted. Alternatively, the program can be failed-over to a standby instance, e.g., a standby device manager, or halting switch AP1.

The time-out period is also set at method segment M1. This is the time after a reset that the associated virtual timer will time out and activate handler 50 unless the timer is reset. The time-out period is chosen to meet fault-response time requirements and irrespective of projected task times. Accordingly, the time-out period can be set shorter than the time projected to complete a task undertaken by a process. This allows the incorporating device to respond more quickly in the event of an actual fault without risking an unnecessary interruption in case of an unusually slow but normal response.

At method segment M2, the dedicated timer 41 is reset or initialized to the time period set in method segment M1. At method segment M3 the program and process are run. In the course of running the process, its progress on a current task is tracked. Also, the virtual timer may be repeatedly reset. The time at which timer 41 is reset can be dependent on the time taken to perform some subtask. If the ongoing process is too slow at completing a subtask, the timer may time out before the process can reset it at method segment M4.

Instead of calling directly for a fault response, a time-out results in activation of watchdog handler 50 at method segment M5. In the meantime, process 23 can continue its mission. Watchdog handler 50 identifies the process whose time out it has responded to, and then checks the progress of the task involved in the time out. If the progress meets the progress criterion (does not meet fault criterion), as determined at method segment M6, method ME1 returns to method segment M2. In this case, the timer is reset and the process (which has not been interrupted) continues at method segment M3. If at method segment M6, the progress criterion is not met (so that fault criterion is met), fault response 59 is initiated by trigger 61 and executed at method segment M7.

In a single-process example, assume a process takes 800 ms to complete a task. Assume that it is necessary to detect a software fault and fail-over to a redundant system in 50 ms. If the process begins executing a task, it can project that it will take 800 ms to complete. During the course of execution, it regularly advances its progress. The virtual timer is set to time-out every 50 ms. The timer triggers the handler to evaluates the criteria. If sufficient progress is being made, the timer is reset; otherwise a fault response is performed. In this example, the worst case detection is 50 ms.

In a multi-process example, a process takes 800 ms to complete a task. The operating system shares the computing resources fairly, but not necessarily equally, among the processes. Assume that it is necessary to detect a software fault and fail-over to a redundant system in 50 ms. If multiple processes each begin executing a task, each can project that it will take 800 ms to complete. However, because the operating system is sharing the computing resources, in the worst case all processes will complete in 800 ms times the number of processes. As in the single-process example, if each process advances its progress, and the handler evaluates the criteria, biasing the expected completion based on how much processing resources the process received, the system will still react in the required 50 ms real time.

While the progress criterion can be set during programming, additional flexibility can be provided by allowing the progress criterion to be defined by values in a configuration file that can be user edited, e.g., using a browser interface to the device management software. Furthermore, the invention provides for automatic adjustments of the progress criterion based on historical tracking data. Note that failure to meet the progress criterion is tantamount to meeting a fault criterion.

The invention applies to network switch software modules and other software for which a rapid and accurate failure detection is required. Some other applications include both network node devices (computers, printers) and network infrastructure devices (switches, hubs, firewalls). The invention applies to situations when only one process is running and situations in which multiple processes are running. The invention can be applied to some or all of plural running processes. These and other variations upon and modifications to the illustrated embodiment are provided by the present invention, the scope of which is defined by the following claims.

What is claimed is:

1. A software fault-detection method comprising:
a software process of a computer-executable program of instructions tracking its own progress on a task;
a watchdog timer, associated with said process, that is independent of a time projected for said process to complete said task and which is set to time an interval less than said time projected for said process to complete said task; and
a watchdog handler;
wherein, in the event said watchdog timer associated with said process times out, in response to the watchdog timer timing out, having said watchdog handler check said progress and make a determination based at least in part on said progress whether a fault criterion is met; and
said watchdog handler executing a fault response in the event said fault criterion is met, and allowing said process to continue without a fault response if said fault criterion is not met, said fault response involving at least one of a reboot and a fail-over;
wherein said process occasionally resets said watchdog timer, but does not reset said watchdog timer if it is less costly to allow said watchdog handler to trigger and check the process' progress.

2. A method as recited in claim 1 wherein said tracking involves projecting a total amount of work required to complete a task, said determination being in part a function of said total.

3. A method as recited in claim 1 wherein said tracking involves projecting a remaining amount of work required to complete a task, said determination being in part a function of said remaining amount.

4. A method as recited in claim 1 wherein said fault response involves activating a standby copy of said program.

5. A method as recited in claim 1 wherein said program includes plural processes that track their own progress and project their own remaining effort.

6. A method as recited in claim 5 wherein said watchdog handler applies different respective fault criteria to detect faults in different processes.

7. A method as recited in claim 1 wherein said program manages a network device.

8. A method as recited in claim 7 wherein said network device is a switch.

9. A method as recited in claim 1 wherein said determination is also made, at least in part, on a number of processor cycles allocated to said process.

10. A device comprising:
hardware for executing at least one process, each such process being associated with a virtual timer that counts an interval less than a time projected for the corresponding process to complete a task;
a hardware timer;
an operating system for providing said virtual timers, wherein said hardware timer is set to a shortest count among the virtual timers; and
a watchdog handler triggered by a time-out of said hardware timer, said handler determining which executing process is associated with the virtual timer having said shortest count on which said hardware timer was set, said watchdog handler programmed for checking on progress of any process for which the corresponding virtual timer has also timed-out;
wherein said watchdog handler does not interrupt a process for which progress is being checked, but allows that process to continue unless the check of progress for that process meets a fault criterion, said watchdog handler being programmed for initiating a fault response if said progress does not meet a fault criterion, said fault response involving at least one of a reboot and a fail-over; and
wherein said fault criterion takes into account how much processing resources that process received prior to the check of progress for that process.

11. A device as recited in claim 10 further comprising a manager program for managing said device, wherein said manager program occasionally resets one of said virtual timers.

12. A device as recited in claim 11 wherein said manager program resets one of said virtual timers to a time dependent on a how long it should take said process to complete a particular subtask.

13. A device as recited in claim 10 further comprising a manager program for managing said device, said manager program having at least a second process, wherein said second process tracks total or remaining time to aid in tracking said progress.

14. A device as recited in claim 10 further comprising additional processes that track their own progress, said handler determining whether respective fault criteria are met in part as a function of an amount of processor cycles allocated to respective ones of said processes.

15. A device as recited in claim 10, wherein each process periodically resets a corresponding virtual timer if doing so costs less than allowing said watchdog handler to trigger and check progress of that process.

16. A computer product comprising non-transitory computer-readable storage media encoded with:
a program of computer-executable instructions, said program including a process that repeatedly projects total time required or time remaining for a task;
a watchdog timer, associated with said process, that is independent of a time projected for said process to complete said task and which is set to time an interval less than said time projected for said process to complete said task; and
a handler that, when triggered by a time-out of said watchdog timer, without issuing an interrupt of said process, checks progress of said progress and, only if said progress fails to meet a progress criterion, initiates a fault response, said fault response involving at least one of a reboot and a fail-over;
wherein said process does not reset said watchdog timer if it is less costly to allow said handler to trigger and check the process' progress.

17. Media as recited in claim 16 wherein said process occasionally resets said watchdog timer.

18. Media as recited in claim 16 wherein said handler determines whether said progress meets said criterion at least in part as a function of processor cycles allocated to said process.

* * * * *